United States Patent
Liu

(10) Patent No.: US 11,370,485 B2
(45) Date of Patent: Jun. 28, 2022

(54) IDENTICAL STEER CONTROL MECHANISM OF RADIAL BAR-LINK TRAPEZOIDAL SWING ARM AND METHOD AND MULTI-WHEEL VEHICLE

(71) Applicant: Haipeng Liu, Baoding (CN)

(72) Inventor: Haipeng Liu, Baoding (CN)

( * ) Notice: Subject to any disclaimer, the term of this patent is extended or adjusted under 35 U.S.C. 154(b) by 0 days.

(21) Appl. No.: 17/209,221

(22) Filed: Mar. 23, 2021

(65) Prior Publication Data

US 2021/0206429 A1     Jul. 8, 2021

Related U.S. Application Data

(63) Continuation of application No. PCT/CN2020/094608, filed on Jun. 5, 2020.

(30) Foreign Application Priority Data

Jul. 12, 2019    (CN) .......................... 2019106271601

(51) Int. Cl.
*B62D 7/16*        (2006.01)
*B62D 7/22*        (2006.01)

(52) U.S. Cl.
CPC .............. *B62D 7/16* (2013.01); *B62D 7/228* (2013.01)

(58) Field of Classification Search
CPC ........ B62D 7/16; B62D 7/228; B62D 7/1527; B62D 7/09; B62D 7/00
See application file for complete search history.

(56) References Cited

U.S. PATENT DOCUMENTS

| | | | | |
|---|---|---|---|---|
| 941,928 A | * | 11/1909 | Jourdain | F16C 11/0619 403/75 |
| 1,389,764 A | * | 9/1921 | Khalil | B62D 7/00 180/6.34 |
| 1,915,816 A | * | 6/1933 | Cole | B62D 7/00 280/444 |
| 5,862,874 A | * | 1/1999 | Brienza | B62D 7/026 180/6.5 |

(Continued)

FOREIGN PATENT DOCUMENTS

| | | | | | |
|---|---|---|---|---|---|
| CN | 109795554 | A | * | 5/2019 | |
| CN | 110282011 | A | * | 9/2019 | ............... B62D 7/09 |

(Continued)

*Primary Examiner* — James A English
*Assistant Examiner* — Matthew D Lee

(57) ABSTRACT

An identical steer control mechanism of a radial bar-link trapezoidal swing arm, a method and a multi-wheel vehicle thereof are disclosed. The radial bar-link trapezoidal swing arm is in a right triangle shape, and in combination with a two-dimensional composite control transmission arm of a cross-shaped groove formed by a transverse groove and a vertical groove, an elliptical gauge is shaped; the longitudinal cosine displacement is controlled by the sliders in the transverse groove, and the transverse sine displacement can be controlled by connecting the sliders in the vertical groove after the right-angle end bearing is hinged to connecting rods, the end bearing on the two-dimensional composite control transmission arm, namely the key control point bearing, draws a deflection elliptical trajectory, and the hinged slider to the key control point bearing is connected with a vector control swing arm sliding slot to generate a steering angle $\beta i$.

9 Claims, 8 Drawing Sheets

(56) References Cited

U.S. PATENT DOCUMENTS

2009/0241708 A1 * 10/2009 Schaedler ............ B62D 11/006
74/388 PS

FOREIGN PATENT DOCUMENTS

| CN | 209395868 U | * | 9/2019 | | |
|---|---|---|---|---|---|
| CN | 210592118 U | * | 5/2020 | | |
| JP | 01153382 A | * | 6/1989 | ........... | B62D 7/1527 |
| JP | 2019202760 A | * | 11/2019 | | |

* cited by examiner

IDENTICAL STEER CONTROL MECHANISM OF RADIAL BAR-LINK TRAPEZOIDAL SWING ARM AND METHOD AND MULTI-WHEEL VEHICLE

TECHNICAL FIELD

The present disclosure relates to the field of non-rail vehicle steering, and more specifically, to an identical steer control mechanism of a radial bar-link trapezoidal swing arm, a method and a multi-wheel vehicle.

BACKGROUND

Currently, in the steering technology of multi-wheel vehicles in China, the front wheel steering is dominated by trapezoidal transmission compensation, but the trapezoidal steering is an approximate steering technology, in the mathematical analysis of the trapezoidal steering, the steering effect curve only overlaps with the ideal relationship in the vicinity of the angles of 3 degrees and 35 degrees, and when the angle is greater than 43 degrees, the dispersion increases, as a result the vehicle tires slip sideways when making a turn (especially when parking), even with steering wheel jitter and squeals.

In order to overcome the above disadvantages, the applicant of the present application has applied for patent application 201822081420.3 in which four embodiments are provided, however, since the four modes are complicated in structure, it is necessary to further simplify the structure and expand the application range in vehicles.

Therefore, how to provide a vehicle with a simple structure and overcome the side slip of the wheel and the shake of the steering wheel due to the limit of the trapezoidal steer in turning (in parking) of the vehicle is an urgent problem to be solved by those skill in the art.

SUMMARY

An identical steer control mechanism of a radial bar-link trapezoidal swing arm is provided to overcome the problems of wheel side slip and steering wheel tilt caused by the restriction of trapezoidal steering in turning (in parking) of a vehicle Technical solutions of the present disclosure are specifically described as follows.

An identical steer control mechanism of a radial bar-link trapezoidal swing arm, which is mounted in the middle of a front end of a vehicle body and has no steering function in a rear wheel of the vehicle, comprising:

A radius bar, one end of the radius bar is fixed to the bottom of a steering wheel column, wherein the steering angle of the steering wheel is $\alpha$, the length of the radius bar (1) is R; the rotation of the steering wheel is configured to drive the radius bar to generate a sine $\sin \alpha$ and a cosine $\cos \alpha$, meanwhile the sine $\sin \alpha$ and the cosine $\cos \alpha$ are configured to follow the rotation of the steering wheel.

A trapezoidal swing arm, one end of the trapezoidal swing arm is fixed perpendicularly to the other end of the radius bar, wherein a fixed pendulum shaft is formed at the fixed point of the trapezoidal swing arm and the radius bar; the length of the trapezoidal swing arm is $R*M/Hi$, and the trapezoidal swing arm is configured to deflect along with the angle of the steering wheel $\alpha$, and simultaneously generates a longitudinal cosine compensation effect $(R*N/Hi)*\sin \alpha$ and a longitudinal displacement of $R*\cos \alpha \pm (R*M/HI)*\sin \alpha$.

A sinusoidal connecting rod, the sinusoidal connecting rod is configured as a horizontal rod arranged in a horizontal direction and has two sleeves, wherein the fixed pendulum shaft is configured to insert into a first sleeve, and the sinusoidal connecting rod is vertically positioned between the radius rod and the trapezoidal swinging arm so as to follow the fixed swinging shaft.

A driven radius bar, wherein one end of the driven radius bar is configured to hinge in a second sleeve, while the other end is configured to hinge to a frame, and the driven radius bar is parallel to the radius bar and has the same length, and in combination with the sinusoidal connecting rod and the radius bar, a parallel four-bar linkage mechanism is formed.

A two-dimensional composite control transmission arm, wherein a cross-shaped groove is arranged on the two-dimension composite control transmission arm, and a transverse groove of the cross-shaped groove is parallel to half-shafts on both sides, while a vertical groove of the cross-shaped groove is parallel to the longitudinal direction of the vehicle body; and a connecting arm is extended on one side of the transverse groove.

A vector control swing arm, a sliding slot is arranged on the vector control swing arm, and the initial position of the setting direction of the sliding slot is parallel to the arrangement direction of the radius bar.

A plurality of sliders, a first slider is configured to fix on one end of the sinusoidal connecting rod and is slidable in the vertical groove to form horizontal sinusoidal displacement $R*\sin \alpha$ of the two-dimensional composite control transmission arm, a second slider is configured to hinge to the other end of the trapezoidal swing arm and is slidable in the transverse groove to make the longitudinal displacement of the two-dimensional composite control transmission arm equal $R*\cos \alpha \pm (R*M/Hi)*\sin \alpha$ constantly, thus controlling the two-dimensional composite control transmission arm to move up and down, left and right vertically and horizontally; a third slider is configured to hinge with one end of the connecting arm to form a critical control point (Gi) and is slidable in the sliding slot.

An auxiliary steering shaft or a solid steering shaft is connected to the sliding slot, and the third slider is configured to drive the sliding slot to rotate around the auxiliary steering shaft, making the auxiliary steering shaft generate a steering angle $\beta i$, then the solid steering shaft is configured to connect with a synchronous gear shaft, or a parallel connecting rod, or a crankshaft double-connecting rod; or the solid steering shaft is directly connected and controlled by the vector control swing arm, and the third slider is configured to drive the sliding slot to rotate around the solid steering shaft to generate the steering angle $\beta i$, then the solid steering shaft is configured to connect to a hub half shaft axially and vertically to make $R*\cos \beta i = R*\cos \alpha \pm R*M/H*\sin \alpha$.

In comparison with the prior art, the disclosed invention provides an identical steer control mechanism of a radial bar-link trapezoidal swing arm, the radial bar and the trapezoidal swing arm are integrated into one body and arranged perpendicular to each other, the structure of the steering mechanism is simplified, and the two-dimensional composite steering transmission arm can be added on the basis of the existing trapezoidal steering mechanism of the vehicle to realize the constant universal steering, which reduces the manufacturing cost, is convenient to install, and is safe and reliable to use. All wheel hub normals and hub stub axles point identically to the same instantaneous travel steering center, eliminating sideslip. In the technical scheme of the invention, as long as the suspension allows, the steering angle of the steering shaft can be turned in a full circle, and side-slip grinding of the tire is prevented in this process, in case of break the conventional trapezoidal steering limit of 40 degree, the cosine compensation displacement drives the longitudinal displacement of the two-dimensional composite control transmission arm to become the main steering assisting force, and the steer angle enters the second quadrant through the straight angular position successively, or even continue to rotate the full circle to four quadrants, which is an obvious difference between the present invention and the conventional trapezoidal steering, and the application object of the large-angle steering is mainly the low-speed lateral parking of the ordinary vehicle or the forklift.

In one embodiment, the length of the radius bar R is determined by the installation space on the vehicle body; the installation space is different for different vehicle types, and the calculation and selection are made according to the vehicle types, such as 75 mm, 105 mm or 125 mm.

In one embodiment, the first slider and the second slider each has a length greater than twice the cross-slot width of the cross-shaped groove in case that the first slider or the second slider slips out of the cross-shaped groove.

In one embodiment, the control mechanism further comprises a housing, the radius bar, the driven radius bar, the trapezoidal swing arm, the sinusoidal connecting rod, the two-dimensional composite control transmission arm, the vector control swing arm, and the sliders are all fixed in the housing, and the bottom of the steering wheel column is configured to insert into the top of the housing and fixed to the radius bar, and the auxiliary steering shaft is configured to extend out of the house to connect a synchronous gear shaft or a parallel connecting rod or the crankshaft double-connecting rod with the solid steering shaft. In the disclosure, dust and impurity on the outside are blocked by the housing, furthermore, a sealing element is arranged at the corresponding position of the extension end of the steering shaft and the housing, and lubricating oil can be filled in the housing to reduce the working resistance and cool the parts inside the housing.

In one embodiment, the trapezoidal swing arm, the two-dimensional composite control transmission arm, the vector control swing arm, and the sliders are configured to be two sets; wherein a first set is configured to be active, a second set is configured to be driven, and the trapezoidal swing arm in the first set is configured to fix to the first sleeve and parallel to the radius bar; while the trapezoidal swing arm in the second set is configured to fix to the second sleeve and parallel to the trapezoidal swing arm in the first set; the other side of the transverse groove of the two-dimensional composite control transmission arm in the second set is provided with the connecting arm, and the connecting arm in the second set is configured to drive the vector control swing arm in the second set through the third slider in the second set, and the installation positions of the first slider and the second slider in the second set are the same as the installation positions and connecting relationships in the first set correspondingly; the effect of the embodiment is that the left and right front wheels can obtain cosine compensation, and as the master-slave operation shares one sinusoidal connecting rod, the acute angle steering can be realized.

In one embodiment, a crankshaft double-connecting rod mechanism is configured to connect at the position of the articulation axis of the radius bar and the driven radius bar, and the crank shaft double-connecting mechanism is formed by adding a fixed-length crank in the same vertical phase of the radius rod and the driven radius bar, and connected by a crank connecting rod, wherein the radius of the fixed-length crank is a constant value of R/2 to 4R/5: the advantage is that the steering angle can be extended to an obtuse angle on the basis of the above embodiment of bilateral compensation for acute angle steering.

In one embodiment, the trapezoidal swing arm, the two-dimensional composite control transmission arm, the vector control swing arm, and the sliders are configured to be two sets; wherein the two-dimensional composite control transmission arm in a first set is arranged at an upper level near a frame, while the two-dimensional composite control transmission arm in a second is set at a lower level of the two-dimensional composite control transmission arm in the first set to ensure the initial position $\alpha=\beta=0$; a double-connecting rod mechanism at an end of the trapezoidal swing arms in the first group is configured to pass through the bottom of the second slider, connect to the trapezoidal swing arm of the second set and then connect to drive the second slider in the second set; and the first slider of the second set is fixed on the other end of the sinusoidal connecting rod, and is configured to move along with the radius rod and the sinusoidal connecting rod; the length of the trapezoidal swing arm of the second set is twice the length of the trapezoidal swing arm of the first group, and the trapezoidal swing arms of the two sets are connected to the second sliders correspondingly; wherein, the driven radius rod is configured to be replaceable with a floating vertical chute arranged on the frame, and the floating vertical chute is configured to connect and control sinusoidal connecting rod to keep parallel to an axle, wherein the floating vertical chute includes a horizontal floating chute which is fixedly connected to the frame and parallel to the axle and a vertical floating chute which is perpendicularly arranged to the horizontal floating chute; a transverse fourth slider in the horizontal floating chute is provided, and the horizontal floating chute is fixed to the vertical floating chute through the transverse fourth slider; a longitudinal fifth slider is slidably arranged in the vertical floating chute, the longitudinal fifth slider is fixed to the first slider; or the transverse fourth slider is vertically fixedly connected to the longitudinal fifth slider which is slidably connected with the vertical floating chute, and the transverse fourth slider is slidably connected with the horizontal floating chute, and the vertical floating chute is fixedly connected with the sinusoidal connecting rod; the transverse fourth slider extends adjacent to each other on both sides, and an upper end of the transverse fourth slider extends below the vertical groove of the two-dimensional composite control transmission arm of the first set, and a lower end of the transverse fourth slider extends above the vertical groove of the two-dimensional composite control transmission arm of the second set, and parallel to the opposite side of a square frame in combination with sinusoidal connecting rod; the floating vertical chute is configured to control the sinusoidal connecting rod to move along the floating vertical chute horizontally and vertically. This embodiment of the left and right front wheel dual-side cosine compensation is applicable to the off-road vehicle with a high chassis due to the stacked arrangement of the mechanisms on both sides, and is also convenient for waterproof packaging in the housing.

In one embodiment, the steering effect of a steering mechanism is configured to control the vector direction of the left front, the left rear, the right front and the right rear wheels and sliding slots which control the length of a vector control arm, wherein the sliding slots which control the length of a vector control arm refer to the vector control arm sliding slot, the vertical groove and the vertical floating chute, and a potentiometer is fixedly installed on one side of the sliding slots which control the length of a vector control arm, and the potentiometer is a direct current sliding resistance potentiometer or an alternating current hall sense brushless potentiometer, and a guide rail control terminal of the sliding resistance potentiometer or a movable coil pull cord end of the hall sense brushless potentiometer is connected to slide blocks which are relatively displaced along the slide slots, The potential of a driving target corresponding to an initial zero position of each potentiometer is a standard radius R; for each drive half shaft implementing the vector linkage electronic control differential, the potentiometer needs to be installed at an appropriate position, so as to correspondingly obtain the target potential required by the steering mechanism vector linkage electric control differential.

In a vehicle without a bar-link trapezoidal swing arm compensation mechanism, the left front wheel vector is the length R of the corresponding radius bar, wherein potentiometer is fixed in length and can be replaced by a standard resistor in different places, and in theory, the left rear wheel vector is a displacement of R*cos α in the vertical floating chute, if a differential drive of the left rear wheels is required, the floating chute is required to be installed, the fifth slider is sleeved with the vertical floating chute or the first slider is sheathed with the vertical floating chute, one side of the vertical floating chute is provided with a potentiometer, and a control end of the potentiometer is connected by a slide bearing, which actually a vertical floating chute is added on the basis of FIG. 1, or a second set of compensation mechanisms for the lower overlap is eliminated on the basis of FIG. 4 and FIG. 5, wherein the right front wheel vector is the displacement vector corresponding to the key control point Gi in the right chute, and the right rear wheel vector represents the cospi displacement, that is, the vertical displacement from the crossing point of the transverse and vertical chutes to the steering shaft core. While in a vehicle with both front wheel mounted with a radial bar-link trapezoidal swing arm compensation mechanism, such as FIG. 2, FIG. 4 and FIG. 5, the left front wheel vector corresponds to the displacement of the key control point Gi in the left sliding slot, and the left rear wheel vector corresponds to the left vertical groove R*cos βi (i.e. the vertical displacement of the intersection point of the transverse groove and the vertical groove from the steering shaft core is fixed on the potentiometer installed on one side of the vertical grooves, the guide rail control terminal to which the sliding brush is connected or the pull cord end of the movable coil of the Hall sense potentiometer is connected to the bottom end of a transverse fourth slider which vertically crosses the vertical groove and follows the transverse direction). And the right front wheel corresponds to the displacement of the key control point Gi in the right chute, and the right rear wheel corresponds to the displacement in the right vertical groove R*cos βi (i.e. the vertical displacement of the crossing point of the transverse and vertical chute from the steer shaft core is fixed on the potentiometer installed on one side of the vertical chute, the guide rail control terminal to which the sliding brush is connected or the pull cord end of the movable coil of the Hall sense potentiometer is connected to the bottom end of a transverse fourth slider which vertically crosses the vertical groove and follows the transverse direction), the corresponding slider bearing is connected with the adjustable control end of the control potentiometer, namely the end of movable coil rope of the sliding resistance potentiometer brush or Hall sense potentiometer.

The potential obtained by a sliding resistance potentiometer or a Hall-sensing brushless potentiometer, which is the target potential of the electronic control differential of the vehicle, is compared with the measure potential of the tachometer generator, a two-branch diode potential balance comparing circuit is use to control the servo differential actuator by negative feedback after amplifying the difference electric signal. In a preferred embodiment. The vector direction of all wheels is always consistent with the vector electronic differential adjustment, which is a differential control mode not provided by the conventional trapezoidal steering, and can adapt to different roads by adjusting the base resistance value and controlling the sensitivity, react faster than the EATON electronic differential lock and allow the inside wheel half shaft to be below the average angular speed.

A multi-wheel vehicle is provided, which comprises the vehicle body, the control mechanism above and a safety limiter, wherein the safety limiter comprises a spring pressure correction cam mechanism and a high-speed safety rotation angle limiting mechanism which are sequentially fixed on the steering wheel column from top to bottom; a pressure sensitive resistance gauge is configured to insert into a cut-off part of a shaft core of the steering wheel column and a gap between the radius bar and both sides of a ring disk notch, and connected a clockwise and a counterclockwise power-assist control circuits of the vehicle steering gear by wires respectively, and the steering wheel column corresponding to a lower end of the ring disk notch is drivingly connected with the rotating shaft core of the radius rod through a universal joint rotating shaft; the vehicle steering gear controlled by the pressure sensitive resistance gauge is assisted by the scroll-bar rack-drive steering, or the spiral rod meshing gear is directly connected to the rotating shaft gear provided on the radius rod to drive the steering assist; the axle center of the solid steering shaft is vertically connected with the vehicle hub half axle, and the safety limiter is used for limiting the steering angle α of the steering wheel to be less than 3 degrees when the vehicle speed is greater than 80 km/h.

In comparison with the prior art, the disclosure multi-wheel vehicle simplifies the structure of the steering control mechanism due to the fact that the radius rod and the trapezoidal swing arm are integrated into a whole and are arranged perpendicularly to each other, and on the basis of the existing trapezoidal steering mechanism of the vehicle, the universal steering can be realized by adding a two-dimensional composite control transmission arm, which reduces the manufacturing cost, is convenient to install, and is safe and reliable to use. All wheel hub normals and hub stub axles point equally to the same instantaneous travel steering center, eliminating sideslip. In the invention, as long as the suspension allows, the steering angle of the steering shaft can be turned into a full circle, and sideslip grinding of the tire is prevented in this process, When beyond the conventional trapezoidal steering limit of 40 degree, the cosine compensation displacement drives the longitudinal displacement of the two-dimensional composite control transmission arm to become the main steering assisting force, and the steer angle enters the second quadrant through the straight angular position successively, and even continues to rotate the full circle of four quadrants, which is the clear distinction between the disclosure and conventional trapezoidal steering, and the application object of this large angle steering is more suitable for low-speed lateral parking of ordinary vehicles or forklifts.

Wherein the spring pressure correction cam mechanism comprises a spring, a pressing plate, a guide rod and an octagonal cam, one end of the spring is fixed with the vehicle body, the other end is connected with the pressing plate, and the guide rod is fix near the spring side of the pressing plate, and the other end of the spring is sleeved on the guide rod; the octagonal cam has eight planes which are fixed on the steering wheel column, and is in contact with the pressing plate; the spring pushes the pressing plate and the guide rod to press the octagonal cam with proper pressure and divide the steering shaft full circle steering angle $\alpha$ into eight parts, with −35~+35 degrees as the starting surface. In the process of manual release state of control the steering wheel by the driver, the steering angle is automatically reset to the most close and safe steering angle at the current steering angle, such as zero-angle straight line, 45-degree fixed-circle steering, right-angle in-situ turning, etc. to ensure that the octagonal cam correction moment has the pressure of 2-5N on the steering wheel handle, and the aim of mechanically correcting the steering wheel is realized.

In high-speed safety rotation angle limiting mechanism, the tachometer generator installed on each drive half shaft generates an average vector differential power supply, and a voltmeter mechanism is driven by the power supply, a pair of limiting forks are arranged on the rotation shaft of the voltmeter structure, and a certain gap is left between the inner side of the limiting fork and the radius bar on the direction column, when the radius of the radius bar is 80 mm, only 4.2 mm of gap is allowed on one side, and only plus or minus 3 degrees of steering angle is allowed, and in the conventional static state of the limiting fork driven by the voltmeter, the limiting forks are close to the horizontal state, and there is no restriction on the turning angle of the radial rod, and when the vehicle speed is increased, the voltmeter mechanism drives the limiting fork to rotate and gradually falls down and tends to be vertical. When the vehicle speed is lower than 10 km/h, the sagging angle of the limiting fork is less than 30 degrees, the limiting fork is not restricted to contact the base of the radius bar, and the steering angle is arbitrary; when the vehicle speed reaches 50 km/h, the limiting fork reaches the position of sagging angle by 60 degrees, the allowable steering angle of the left gap is plus or minus 6.05 degrees, and when the vehicle speed reaches more than 80 km/h, the limiting fork turns vertically. The gap (4.2 mm) from the distal end of the radius bar only allows plus or minus 3 degrees' steering, and the centrifugal force when the vehicle turns is 0.4 times of the gravity acceleration, which is within the safe range of centripetal force provided by road friction force (generally the road friction system is 0.45~0.6). In the mount position of the pressure sensitive resistance gauge, the shaft core of the steering column is disconnect, and the pressure sensitive resistance gauge is inserted between two sides of a radius bar and a short column on a ring disk, the two pressure sensitive resistance gauges are configured to control the clockwise and counterclockwise assist power respectively. Therefore, the redundant steering power control of steering wheel angle is realized, and the safety of the vehicle is ensured.

A controlling method for an identical steer control mechanism of a radial bar-link trapezoidal swing arm is provided, wherein the method comprises: forming a right triangle by arranging a radius bar and a trapezoidal swing arm vertically, wherein the radius bar is a strand edge of the right triangle, the trapezoidal swing arm is a hook edge, and an extension line of the chord edge points to a steering center of a frame, the steering center of the frame is a fixed axle which does not participate in steering; rotating a steering wheel angle $\alpha$ equals 90 degrees to make a traveling steering center coincide with the steering center point of the frame, wherein the hook edge deflects with the strand edge, and the longitudinal displacement of the top of hook edge is identical to $R*\cos \beta = R*\cos \alpha + (R*M/H)*\sin \alpha$, which is the universal steering formula evolved from Ackermann's steering formula; hinging an end of the trapezoidal swing arm which is also the top of the hook edge with a transverse groove of the two-dimensional composite control transmission arm to control a longitudinal cosine displacement, wherein the transverse groove is connected to a second slider; hinging an end bearing of the radius bar which is also the crossing point of the strand edge and the right triangle with a sinusoidal connecting rod to control a sinusoidal displacement, wherein the sinusoidal connecting rod is fixed to a first slider, and then connecting a vertical groove to transmit the sinusoidal displacement to the vertical groove, and controlling the two-dimensional composite control transmission arm horizontally and vertically; hinging a two-dimensional composite critical control point Gi with a third slider via a connecting arm by a two dimensional composite control transmission arm, thus producing a rotating angle ($\beta$i) by drivingly controlling a sliding slot; forming a deflection elliptical compass by a combination of the right triangle with the radius bar and a cross-shaped groove of the two-dimensional composite control transmission arm.

In the method of the disclosure, the vertex of the right triangle outside the cross-shaped groove is configured as the fixed rotation axis and the origin of the polar coordinates, and under the condition of keeping the transverse and vertical groove of the cross-shaped groove of the elliptical compass horizontal and vertical, the elliptical compass is configured to rotate as a whole when driven by the right triangle, and use the crossing point Gi of the cross-shaped groove as a brush to draw a deflection ellipse.

DETAILED DESCRIPTION OF EMBODIMENTS

The disclosure is further described below in combination with specific embodiments, not as a limitation to its scope of protection.

Figure 1:
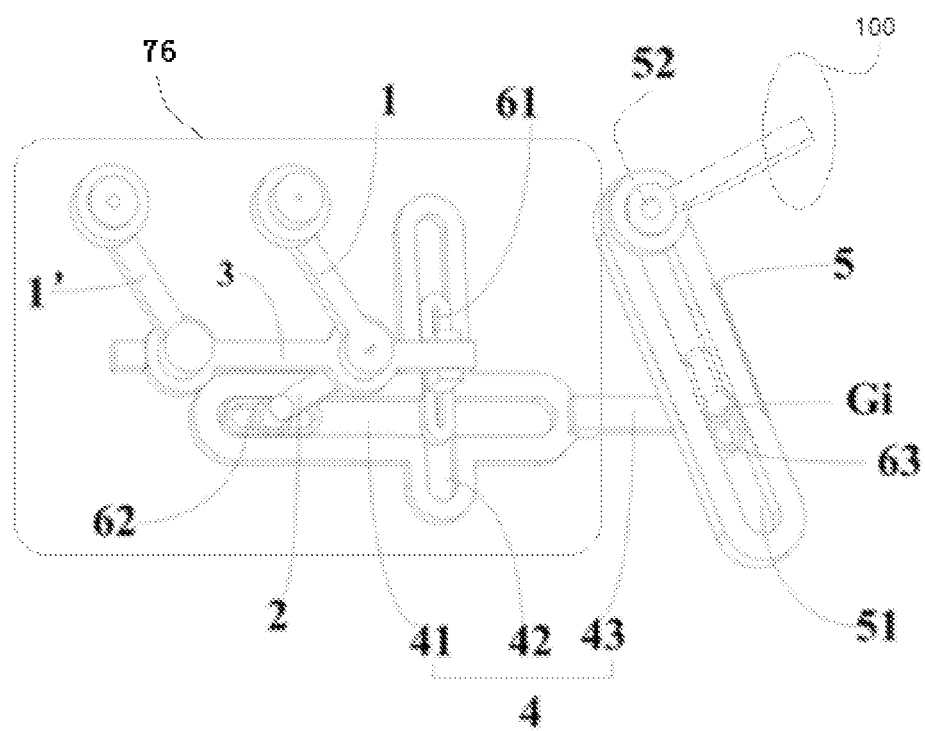
FIG. 1 is a schematic structural diagram of one embodiment of one-side cosine compensation of the right front wheel of the radius bar-link trapezoidal swing arm identical steering control mechanism.

Referring to FIG. 1, the present invention provides an embodiment of one-side compensation of a right wheel, a radius bar integral trapezoidal swing arm identical steering control mechanism, which is mounted in the middle of a front end of a vehicle body, and the rear wheels of the vehicle have no steering function, comprises a radius bar 1, a first trapezoidal swing arm 2, a sinusoidal connecting rod 3, A driven radius bar 1', a first two-dimensional composite control transmission arm 4, a first A vector control swing arm 5, and a first set of sliders.

A first end of the radius bar 1 is fixed to a bottom of a steering wheel column. A steering angle of the steering wheel is $\alpha$, a length of the radius bar 1 is R; rotation of the steering wheel is configured to drive the radius bar 1 to generate a sine $\sin \alpha$ and a cosine $\cos \alpha$. The sine $\sin \alpha$ and the cosine $\cos \alpha$ are configured to follow the rotation of the steering wheel.

One end of the first trapezoidal swing arm 2 is fixed perpendicularly to a second end of the radius bar 1. A fixed pendulum shaft is formed at the fixed point of the trapezoidal swing arm and the radius bar. A length of the trapezoidal swing arm 2 is R*M/Hi, and the trapezoidal swing arm is configured to deflect along with an angle of the steering wheel $\alpha$, and simultaneously generates a longitudinal cosine compensation effect $(R*N/Hi)*\sin \alpha$ and a longitudinal displacement of $R*\cos \alpha \pm (R*M/HI)*\sin \alpha$. M represents a distance between between steering axles of two front wheels of a vehicle body; Hi represents a distance from any steering axle to a steering center point of a frame.

The sinusoidal connecting rod 3 is configured as a horizontal rod arranged in a horizontal direction and has two sleeves. The fixed pendulum shaft is configured to insert into a first sleeve. The sinusoidal connecting rod 3 is vertically positioned between the radius rod 1 and the trapezoidal swinging arm 2 so as to move along with the fixed swinging shaft.

A first end of the driven radius bar 1' is configured to hinge in a second sleeve, while a second end of the driven radius bar 1' is configured to hinge to a frame, and the driven radius bar 1' is parallel to the radius bar 1 and has a same length as the radius bar 1. The driven radius bar 1' in combination with the sinusoidal connecting rod 3, the frame, and the radius bar 1 to form a parallel four-bar linkage mechanism.

A cross-shaped groove is arranged on the first two-dimension composite control transmission arm 4, and a transverse groove 41 of the cross-shaped groove is parallel to half-shafts on both sides. A vertical groove 42 of the cross-shaped groove is parallel to the longitudinal direction of the vehicle body, and a connecting arm 43 is extended on one side of the transverse groove 41.

A sliding slot 51 is arranged on the first vector control swing arm 5, and an initial position of a setting direction of the sliding slot 51 is parallel to an arrangement direction of the radius bar 1.

A first slider 61 of the first set of sliders is configured to fix on one end of the sinusoidal connecting rod 3 and is slidable in the vertical groove 42 to form horizontal sinusoidal displacement $R*\sin \alpha$ of the first two-dimensional composite control transmission arm 4; a second slider 62 of the first set of sliders is configured to hinge to the second end of the first trapezoidal swing arm 2 and is slidable in the transverse groove 41 to make the longitudinal displacement of the first two-dimensional composite control transmission arm 4 equal to $R*\cos \alpha \pm (R*M/Hi)*\sin \alpha$ constantly, thus controlling the first two-dimensional composite control transmission arm 4 to move up and down, left and right vertically and horizontally. A third slider 63 of the first set of sliders is configured to hinge with one end of the connecting arm 43 to form a critical control point (Gi) and is slidable in the sliding slot 51 of the first vector control swing arm 5.

Figure 8:
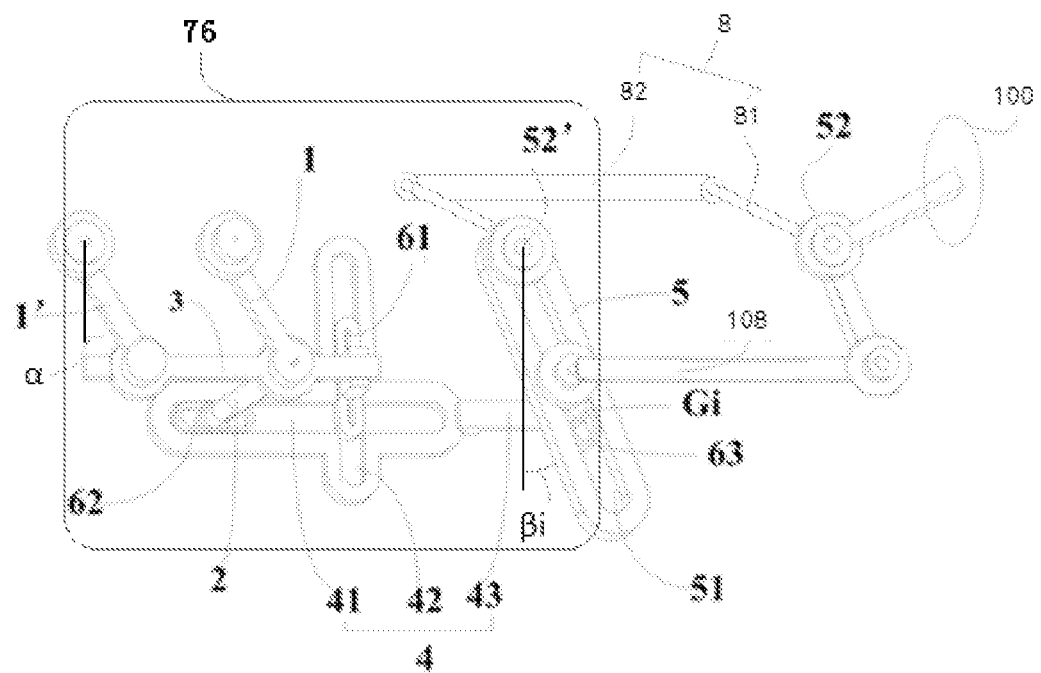
FIG. 8 is a schematic structural diagram of one embodiment of one-side cosine compensation of the right front wheel of the radius bar-link trapezoidal swing arm identical steering control mechanism.

An auxiliary steering shaft 52' or a solid steering shaft 52' is connected to the sliding slot 51. As shown in FIG. 8, when the auxiliary steering shaft 52' is connected to the sliding slot 51, the third slider 63 of the first set of slider is configured to drive the sliding slot 51 to rotate around the auxiliary steering shaft 52', making the auxiliary steering shaft 52' generate a steering angle $\beta$. Then the auxiliary steering shaft 52' is connected to the solid steering shaft 52 through a synchronous gear shaft, a parallel connecting rod 108, or a crankshaft double-connecting rod.

As shown in FIG. 1, when solid steering shaft 52' is connected to the sliding slot 51, the solid steering shaft 52 is directly connected and controlled by the first vector control swing arm 5, and the third slider 63 is configured to drive the sliding slot 51 to rotate around the solid steering shaft 52 to generate the steering angle $\beta i$, then the solid steering shaft 52 is configured to connect to a hub half shaft axially and vertically to make $R*\cos \beta i = R*\cos \alpha + R*M/H*\sin \alpha$.

In the embodiment, the radial bar 1 and the first trapezoidal swing arm 2 are integrated into one body and are arranged perpendicular to each other, so a structure of the steering mechanism is simplified. The first two-dimensional composite steering transmission arm can be added on the basis of the existing trapezoidal steering mechanism of the vehicle to realize the constant universal steering, which reduces the manufacturing cost, is convenient to install, and is safe and reliable to use. All wheel hub normals and hub stub axles point identically to the same instantaneous travel steering center, eliminating sideslip. In the technical scheme of the invention, as long as the suspension allows, the steering angle of the steering shaft can be turned in a full circle, and side-slip grinding of the tire is prevented in this process, in case of break the conventional trapezoidal steering limit of 40 degree, the cosine compensation displacement drives the longitudinal displacement of the two-dimensional composite control transmission arm to become the main steering assisting force, and the steer angle enters the second quadrant through the straight angular position successively, or even continue to rotate the full circle to four quadrants, which is an obvious difference between the present invention and the conventional trapezoidal steering, and the application object of the large-angle steering is mainly the low-speed lateral parking of the ordinary vehicle or the forklift.

In one embodiment, the length of the radius bar 1 R is determined by an installation space on the vehicle body. The installation space is different for different vehicle types, and the calculation and selection of the length of the radius bar 1 R are made according to the vehicle types. For example, the length of the radius bar 1 R is selected from 75 mm, 105 mm or 125 mm.

In one embodiment, the first slider 61 and the second slider 62 of the first set of sliders each has a length greater than twice of a cross-slot width of the cross-shaped groove to prevent the first slider 61 or the second slider 62 of the first set of sliders slips out of the cross-shaped groove.

In one embodiment, the control mechanism further comprises a housing 76. The radius bar 1, the driven radius bar 1', the first trapezoidal swing arm 2, the sinusoidal connecting rod 3, the first two-dimensional composite control transmission arm 4, the first vector control swing arm 5, and the first set of sliders are all fixed in the housing 76. The bottom of the steering wheel column is configured to insert into the top of the housing 76 and is fixed to the radius bar 1. The auxiliary steering shaft 52' is configured to extend out of the housing 76 to connect the synchronous gear shaft or the parallel connecting rod 108 or the crankshaft double-connecting rod with the solid steering shaft 52. In the embodiment, dust and impurity on the outside are blocked by the housing 76. Furthermore, a sealing element is arranged at the corresponding position of the extension end of the steering shaft and the housing 76, and lubricating oil can be filled in the housing 76 to reduce the working resistance and cool the parts inside the housing.

Figure 2:
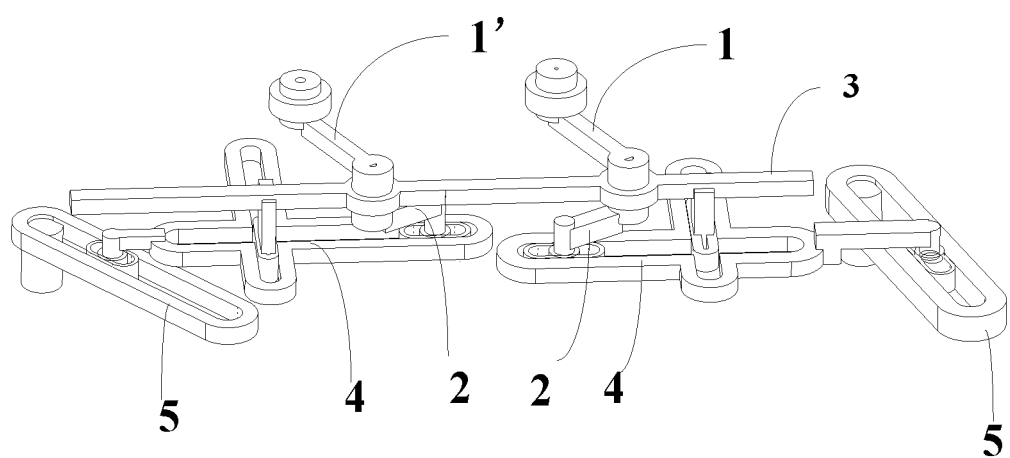
FIG. 2 is a schematic structural diagram of one embodiment of the side-by-side arrangement of the left and right dual-side wheel cosine compensation of the radius bar-link trapezoidal swing arm identical steering control mechanism.

Referring to FIG. 2, in another embodiment, two trapezoidal swing arms 2, two two-dimensional composite control transmission arms 4, two vector control swing arms 5, and two sets of sliders are provided. The first trapezoidal swing arm 2 is an active trapezoidal swing arm. The first two-dimensional composite control transmission arm 4 is an active two-dimensional composite control transmission arm. The first vector control swing arm 5 is an active vector control swing arm. The first set of sliders are active sliders. A second trapezoidal swing arm 2 has a same structure as the first trapezoidal swing arm and is a driven trapezoidal swing arm. A second two-dimensional composite control transmission arm 4 has a same structure as the first two-dimensional composite control transmission arm and is a driven two-dimensional composite control transmission arm. A second vector control swing arm 5 has a same structure as the first vector control swing arm and is a driven vector control swing arm. A second set of sliders have a same structure as the first set of sliders and are driven sliders.

The first trapezoidal swing arm 2 is configured to fix to the first sleeve and is parallel to the radius bar 1; while the second trapezoidal swing arm 2 is configured to fix to the second sleeve and is parallel to the first trapezoidal swing arm 2. The other side of the transverse groove 41 of the second two-dimensional composite control transmission arm 4 is provided with a second connecting arm, and the second connecting arm is configured to drive the second vector control swing arm 5 through the third slider 63 of the second set of sliders. The installation positions of the first slider 61 and the second slider 62 of the second set of sliders are the same as the installation positions of that of the first set of sliders. The effect of the embodiment is that the left and right front wheels 100 can obtain cosine compensation, and as the master-slave operation shares one sinusoidal connecting rod 3, the acute angle steering can be realized.

Figure 3:
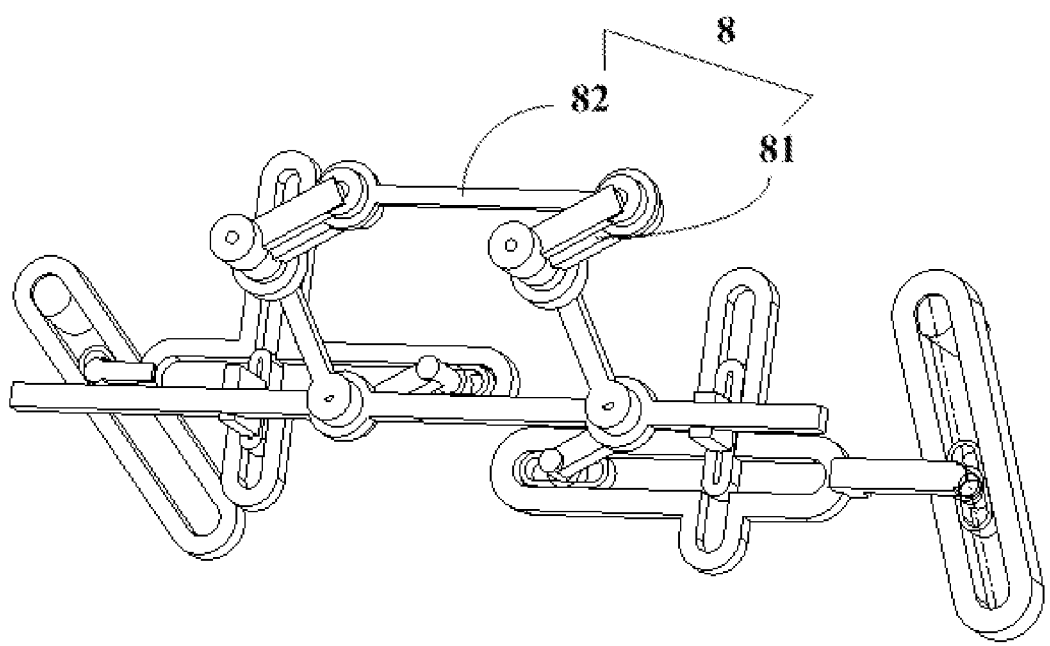
FIG. 3 is a schematic structural diagram of another embodiment of the side-by-side arrangement of the left and right dual-side wheel cosine compensation of the radius bar-link trapezoidal swing arm identical steering control mechanism.

In one embodiment, referring to FIG. 3, on the basis of FIG. 2, a crankshaft double-connecting rod mechanism 8 is configured to connect the radius bar 1 and the driven radius bar 1'. A fixed-length crank 81 is respectively arranged on a same vertical phase of the radius bar 1 and the driven radius bar. The fixed-length cranks 81 are connected by a crank connecting rod 82 to form the crank shaft double-connecting mechanism 8. A radius of each fixed-length crank 81 is a constant value of R/2 to 4R/5. The advantage is that the steering angle can be extended to an obtuse angle on the basis of the above embodiment of bilateral compensation for acute angle steering.

Figure 4:
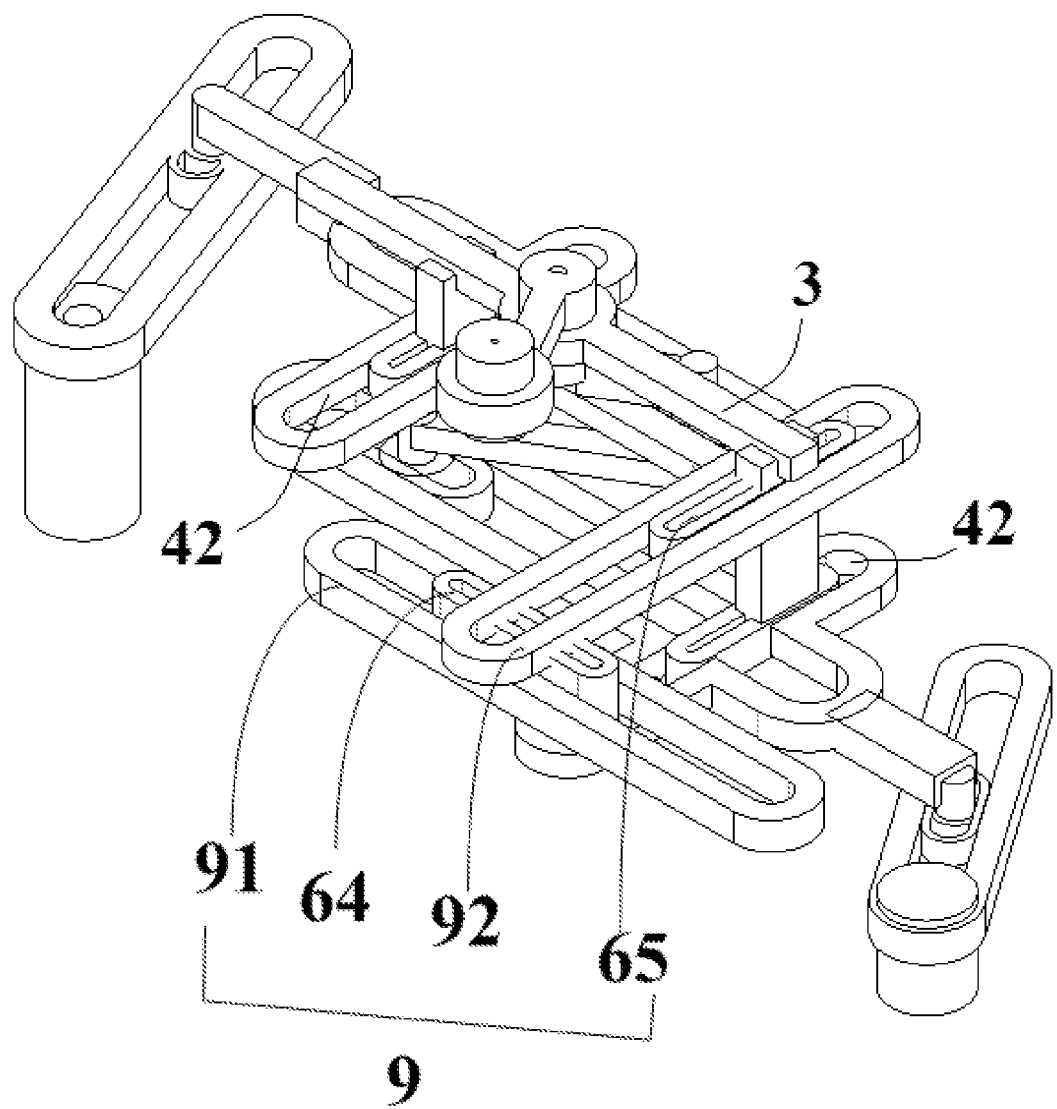
FIG. 4 is a schematic structural diagram of one embodiment of overlapping arrangement of left and right dual-side wheel cosine compensation of radius bar-link trapezoidal swing arm identical steering control mechanism.
Figure 5:
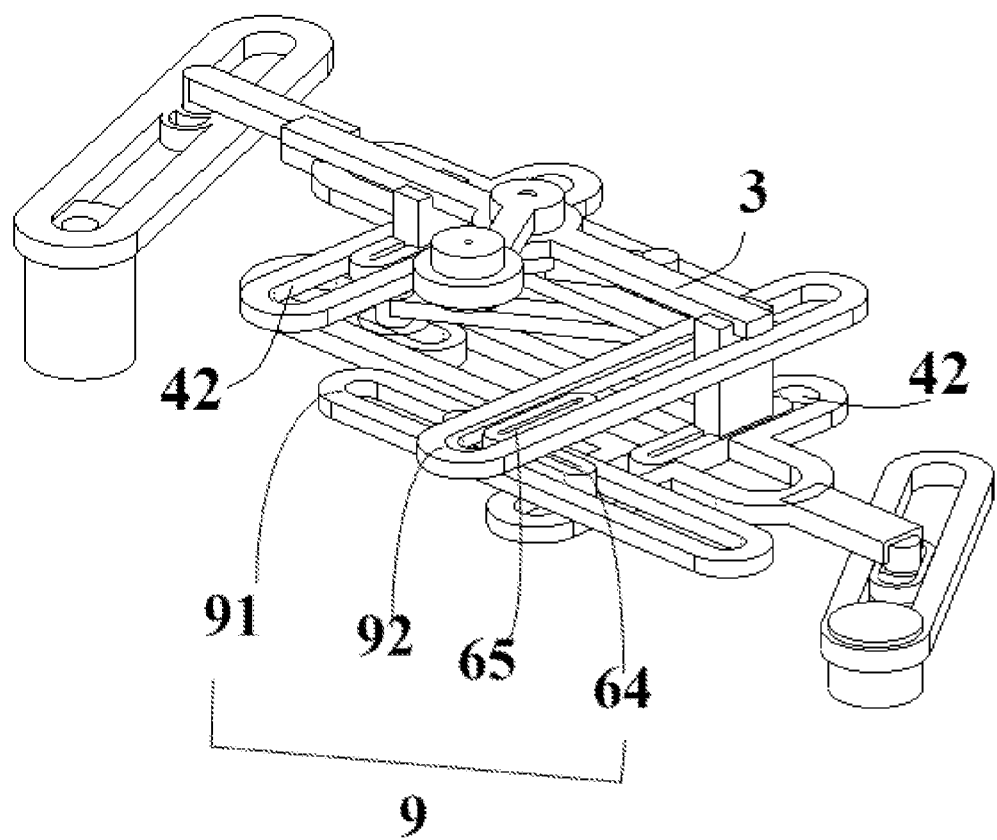
FIG. 5 is a schematic structural diagram of another embodiment of the laminated arrangement of the left and right dual-side wheel cosine compensation of the radial bar link trapezoidal swing arm identical steering control mechanism.
Figure 6:
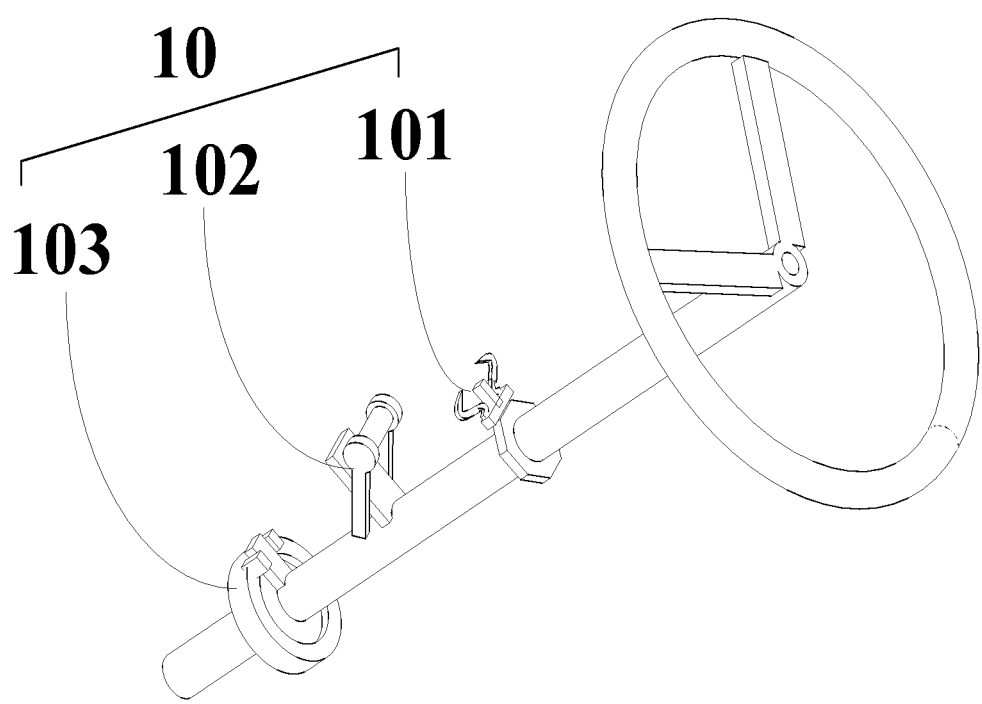
FIG. 6 is a schematic diagram of installation position of safety limiter on a multi-wheel vehicle.

In one embodiment, referring to FIG. 4 and FIG. 5, two trapezoidal swing arms 2, two two-dimensional composite control transmission arms 4, two vector control swing arms 5, and two sets of sliders are provided. The first two-dimensional composite control transmission arm 4 is arranged at an upper level near a frame, while the second two-dimensional composite control transmission arm 4 is arranged at a lower level of the first two-dimensional composite control transmission arm 4 to ensure the initial position $\alpha=\beta=0$. A double-connecting rod mechanism at an end of the first trapezoidal swing arm 2 is configured to pass through the bottom of the second slider 62 of the second set of sliders connect to the second trapezoidal swing arm 2 and then connect to drive the second slider 62 of the second set of sliders. The first slider 61 of the second set of sliders is fixed on the other end of the sinusoidal connecting rod 3, and is configured to move along with the radius rod 1 and the sinusoidal connecting rod 3. A length of the second trapezoidal swing arm 2 is twice the length of the first trapezoidal swing arm 2. The two trapezoidal swing arms are connected to the second sliders 62 of the two sets of sliders correspondingly. THE driven radius rod 1' is configured to be replaceable with a floating vertical chute 9 arranged on the frame, and the floating vertical chute 9 is configured to connect and control sinusoidal connecting rod 3 to keep parallel to an axle. The floating vertical chute 9 includes a horizontal floating chute 91 which is fixedly connected to the frame and is parallel to the axle, and a vertical floating chute 92 which is perpendicularly arranged to the horizontal floating chute 91. A transverse fourth slider 64 arranged in the horizontal floating chute 91 is provided, and the horizontal floating chute 91 is fixed to the vertical floating chute 92 through the transverse fourth slider 64. A longitudinal fifth slider 65 is slidably arranged in the vertical floating chute 92, the longitudinal fifth slider 65 is fixed to the first slider 61; or the transverse fourth slider 64 is vertically fixedly connected to the longitudinal fifth slider 65 which is slidably connected with the vertical floating chute 92. The transverse fourth slider 64 is slidably connected with the horizontal floating chute 91, and the vertical floating chute 92 is fixedly connected with the sinusoidal connecting rod 3. The transverse fourth slider 64 extends adjacent to each other on both sides, and an upper end of the transverse fourth slider 64 extends below the vertical groove 42 of the first two-dimensional composite control transmission arm 4. A lower end of the transverse fourth slider 64 extends above the vertical groove 42 of the second two-dimensional composite control transmission arm 4 and is parallel to the opposite side of a square frame in combination with sinusoidal connecting rod. The floating vertical chute 9 is configured to control the sinusoidal connecting rod 3 to move along the floating vertical chute horizontally and vertically. This embodiment of the left and right front wheel dual-side cosine compensation is applicable to the off-road vehicle with a high chassis due to the stacked arrangement of the mechanisms on both sides, and is also convenient for waterproof packaging in the housing 76.

In the embodiment of the urban front-drive vehicle type, as shown in FIG. 1, the vehicle without the bar-link trapezoidal swing arm compensation mechanism for the left front wheel 100, the left front wheel vector is the length R of the corresponding radius bar 1 (the potentiometer is fixed in length and can be replaced by a fixed standard resistor in different places), and the right front wheel vector is the displacement vector of the hinged third slider 63 corresponding to the key control point Gi in the right sliding slot 51 of the first vector control swing arm 5. In one side of the sliding slot 51 of the first vector control swing arm 5, a sliding resistance potentiometer or a Hall sense brushless potentiometer is installed, and a guide rail control terminal to which the sliding brush is connected or a movable coil rope end of the Hall sense potentiometer is connected to a third slider 63 of the first set of sliders in conjunction with that critical control point bear. On condition that the average pow source formed by the tachometer generator driven by the left and right half shafts is the power supply. The electric regulating differential target potential of the right front wheel drive half shaft is obtained from the potentiometer, and the potential of the electronic regulation differential target of the left front wheel drive half shaft is obtained from the fixed standard resistor. Compared with the measured potential of a speed measuring generator of the front wheel driving half shaft on both sides, in the potential balance compare circuit of the two-branch diode, the servo differential actuator is controlled by negative feedback when the difference electric signal is amplified. This is the city SUV vector linkage electronic control differential standard, the rear wheel is a fixed idler, the trailer is allowed when lift the front wheel.

In a four-wheel drive vehicle as an example, the steer control mechanism of the four-wheels vehicle controls the vector direction of the front wheel as well as the vector length of all-wheel driving.

In a vehicle without a bar-link trapezoidal swing arm compensation mechanism in the left front wheel, the left front wheel vector is the length R of the corresponding radius bar (wherein potentiometer is fixed in length and can be replaced by a standard resistor in different places), and in theory, the left rear wheel vector is a displacement of $R*\cos \alpha$ in the vertical floating chute 92 (if a differential drive of the left rear wheels is required, the floating chute is required to be installed, the fifth slider 65 is sleeved with the vertical floating chute 92 or the first slider 61 is sheathed with the vertical floating chute 92, one side of the vertical floating chute 92 is provided with a potentiometer, the potentiometer control terminal is connected by a fifth slider 65 or a first slider 61 bearing, which actually a vertical floating chute 92 is added on the basis of FIG. 1, or a second set of compensation mechanisms for the lower overlap is eliminated on the basis of FIG. 4 and FIG. 5), wherein the right front wheel vector is the displacement vector corresponding to the key control point Gi in the right sliding slot 51 (a sliding resistance potentiometer or a Hall sense brushless potentiometer is installed at one side of the slide groove 51, and a guide rail control terminal to which the sliding brush is connected or a movable coil rope end of the Hall sense potentiometer is connected to the third slider 63), and the right rear wheel vector represents the $R*\cos \beta i$ displacement of the right vertical groove, that is, the vertical displacement from the crossing point of the transverse and vertical chutes to the steering shaft core (one side of the right vertical groove 42 is installed with a potentiometer, the guide rail control terminal to which the sliding brush is connected or the movable coil cable end of the Hall sense potentiometer is connected to the upper end of a transverse fourth slider 64 extending to the cross-point position of the right vertical groove 42).

In a four-wheel drive embodiment, the front wheel on both sides are mounted with a radius bar-link trapezoidal swing arm compensation mechanism, shown as FIG. 2, FIG. 4 and FIG. 5, the left front wheel vector corresponds to the displacement of the key control point Gi in the left sliding slot 51, and the left rear wheel vector corresponds to the left vertical groove $42 R*\cos \beta i$ (i.e. the vertical displacement of the intersection point of the transverse groove 41 and the vertical groove 42 from the steering shaft core is fixed on the potentiometer installed on one side of the vertical grooves 42, the guide rail control terminal to which the sliding brush is connected or the pull cord end of the movable coil of the Hall sense potentiometer is connected to the bottom end of a transverse fourth slider 64 which vertically crosses the vertical groove 42 and follows the transverse direction). And the right front wheel corresponds to the displacement of the key control point Gi in the right sliding slot 51, (a sliding resistance potentiometer or a Hall sense brushless potentiometer is installed at one side of the slide groove 51, and a guide rail control terminal to which the sliding brush is connected or a movable coil rope end of the Hall sense potentiometer is connected to the third slider 63), and the right rear wheel corresponds to the displacement in the right vertical groove $42 R*\cos \beta i$ (i.e. the vertical displacement of the crossing point of the transverse and vertical groove 42 from the steer shaft core is fixed on the potentiometer installed on one side of the vertical groove 42, the guide rail control terminal to which the sliding brush is connected or the pull cord end of the movable coil of the Hall sense potentiometer is connected to the bottom end of a transverse fourth slider 64 which vertically crosses the vertical groove 42 and follows the transverse direction), the corresponding slider bearing is connected with the adjustable control end of the control potentiometer, namely the end of movable coil rope of the sliding resistance potentiometer brush or Hall sense potentiometer. The potential of the driving target corresponding to the initial zero position of each potentiometer is the standard radius R.

In the embodiment of front wheel steers without driving and rear wheel with driving, the driving arrangements for steering of front wheel and rear wheel require only the front wheels drive vector potentiometer to be eliminated and retained in a four wheel driving vehicle embodiment. In the process of large-angle steering, the electronic control differential of the rear wheel becomes the main factor of the steering power.

An average power supply is formed by rectifying the tachometer generators that participate in driving, and a sliding resistance potentiometer or a Hall sense brushless potentiometer is redistributed from the average power-supply voltage in proportion to the length of the vector. The obtained potential is the target potential corresponding to the electronic regulation differential driving the half axle, and in comparison with the measured potential of the tachometer generator, a two-branch diode potential balance comparing circuit is used to control the servo differential actuator by negative feedback after amplifying the difference electric signal. In the servo differential speed actuator, there are several options to choose, such as brake clutch electronic limit slip, hub motor power supply electronic switch control power distribution, or electronic CVT stepless speed change, electronic planetary gear hydraulic pump transmission stepless gear change, etc.

The vector direction of all wheels is always consistent with the vector electronic differential adjustment, which is a differential control mode not provided by the conventional trapezoidal steering, and can adapt to different roads by adjusting the base resistance value and controlling the sensitivity, react faster than the EATON electronic differential lock and allow the inside wheel half shaft to be below the average angular speed.

A multi-wheel vehicle is provided, which comprises the vehicle body, the control mechanism above and a safety limiter 10, wherein the safety limiter 10 comprises a spring pressure correction cam mechanism 101 and a high-speed safety rotation angle limiting mechanism 102 which are sequentially fixed on the steering wheel column from top to bottom; a pressure sensitive resistance gauge 103 is configured to insert into a cut-off part of a shaft core of the steering wheel column and a gap between the radius bar 1 and both sides of a ring disk notch, and connected a clockwise and a counterclockwise power-assist control circuits of the vehicle steering gear by wires respectively, and the steering wheel column corresponding to a lower end of the ring disk notch is drivingly connected with the rotating shaft core of the radius bar 1 through a universal joint rotating shaft; the vehicle steering gear controlled by the pressure sensitive resistance gauge 103 is assisted by the scroll-bar rack-drive steering, or the spiral rod meshing gear is directly connected to the rotating shaft gear provided on the radius bar 1 to drive the steering assist; the axle center of the solid steering shaft is vertically connected with the vehicle hub half axle, and the safety limiter 10 is used for limiting the steering angle α of the steering wheel to be less than 3 degrees when the vehicle speed is greater than 80 km/h.

In one embodiment, the spring pressure correction cam mechanism 101 comprises a spring, a pressing plate, a guide rod and an octagonal cam, one end of the spring is fixed with the vehicle body, the other end is connected with the pressing plate, and the guide rod is fix near the spring side of the pressing plate, and the other end of the spring is sleeved on the guide rod; the octagonal cam has eight planes which are fixed on the steering wheel column, and is in contact with the pressing plate; the spring pushes the pressing plate and the guide rod to press the octagonal cam with proper pressure and divide the steering shaft full circle steering angle α into eight parts, with −35~+35 degrees as the starting surface. In the process of manual release state of control the steering wheel by the driver, the steering angle is automatically reset to the most close and safe steering angle at the current steering angle, such as zero-angle straight line, 45-degree fixed-circle steering, right-angle in-situ turning, etc. to ensure that the octagonal cam correction moment has the pressure of 2-5N on the steering wheel handle, and the aim of mechanically correcting the steering wheel is realized.

In one embodiment, the high-speed safety rotation angle limiting mechanism 102, the tachometer generator installed on each drive half shaft generates an average vector differential power supply, and a voltmeter mechanism is driven by the power supply, a pair of limiting forks are arranged on the rotation shaft of the voltmeter structure, and a certain gap is left between the inner side of the limiting fork and the radius bar on the direction column, when the radius of the radius bar is 80 mm, only 4.2 mm of gap is allowed on one side, and only plus or minus 3 degrees of steering angle is allowed, and in the conventional static state of the limiting fork driven by the voltmeter, the limiting forks are close to the horizontal state, and there is no restriction on the turning angle of the radial rod, and when the vehicle speed is increased, the voltmeter mechanism drives the limiting fork to rotate and gradually falls down and tends to be vertical. When the vehicle speed is lower than 10 km/h, the sagging angle of the limiting fork is less than 30 degrees, the limiting fork is not restricted to contact the base of the radius bar, and the steering angle is arbitrary; when the vehicle speed reaches 50 km/h, the limiting fork reaches the position of sagging angle by 60 degrees, the allowable steering angle of the left gap is plus or minus 6.05 degrees, and when the vehicle speed reaches more than 80 km/h, the limiting fork turns vertically. The gap (4.2 mm) from the distal end of the radius bar only allows plus or minus 3 degrees' steering, and the centrifugal force when the vehicle turns is 0.4 times of the gravity acceleration, which is within the safe range of centripetal force provided by road friction force (generally the road friction system is 0.45~0.6). In the mount position of the pressure sensitive resistance gauge 103, the shaft core of the steering column is disconnect, and the pressure sensitive resistance gauge 103 is inserted between two sides of a radius bar and a short column on a ring disk, the two pressure sensitive resistance gauges 101 are configured to control the clockwise and counterclockwise assist power respectively. Therefore, the redundant steering power control of steering wheel angle is realized, and the safety of the vehicle is ensured.

The embodiment above, the vertex of the right triangle outside the cross-shaped groove is configured as the fixed rotation axis and the origin of the polar coordinates, and under the condition of keeping the transverse and vertical groove 43 of the cross-shaped groove of the elliptical compass horizontal and vertical, the elliptical compass is configured to rotate as a whole when driven by the right triangle, and use the crossing point Gi of the cross-shaped groove as a brush to draw a deflection ellipse.

Figure 7:
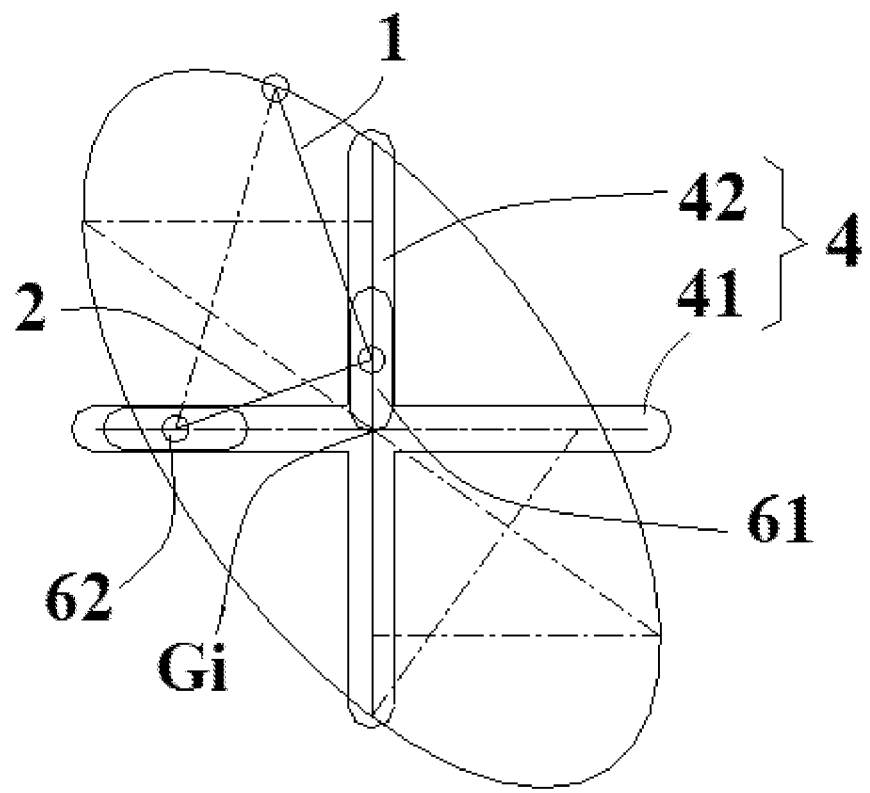
FIG. 7 is a schematic diagram of the principle of the identical steering mechanism for the radius bar-link trapezoidal swing arm.

In particular, referring to FIG. 7, a controlling method for an identical steer control mechanism of a radial bar-link trapezoidal swing arm is provided, wherein the method comprises:

forming a right triangle by arranging a radius bar 1 and a first trapezoidal swing arm 2 perpendicular to the radius bar 1, wherein the radius bar 1 is a short right-angled side of the right triangle, the first trapezoidal swing arm 2 is a long right-angled side of the right triangle; an extension line of a oblique right-angled side of the right triangle points to a steering center of a frame, the steering center of the frame is a point on a fixed axle which does not participate in steering;

rotating a steering wheel angle α to equal 90 degrees to make a traveling steering center coincide with a steering center point of the frame, wherein the short right-angled side of the right triangle deflects with the long right-angled side of the right triangle, and a longitudinal displacement of a top point of the short right-angled side of the right triangle is equal to $R^*\cos \beta = R^*\cos \alpha + (R^*M/H)^*\sin \alpha$, which is a universal steering formula evolved from Ackermann's steering formula;

hinging an end of the first trapezoidal swing arm 2, which is also a top point of the short right-angled side of the right triangle, with a transverse groove 41 of a first two-dimensional composite control transmission arm 4 to control a longitudinal cosine displacement; wherein the transverse groove 41 is connected to a second slider 62 of a first set of sliders;

hinging an end bearing of the radius bar which is also a crossing point of the long right-angled side of the right triangle and the short right-angled side of the right triangle with a sinusoidal connecting rod 3 to control a sinusoidal displacement, wherein the sinusoidal connecting rod 3 is fixed to a first slider 61 of the first set of sliders, connecting a vertical groove 43 to transmit the sinusoidal displacement to the vertical groove 43, and controlling the first two-dimensional composite control transmission arm 4 horizontally and vertically;

hinging a two-dimensional composite critical control point Gi with a third slider of the first set of sliders via a connecting arm by the first two-dimensional composite control transmission arm 4, thus producing a rotating angle by drivingly controlling a sliding slot 51; and forming a deflection elliptical compass by a combination of the right triangle and a cross-shaped groove of the first two-dimensional composite control transmission arm 4.

What is claimed is:

1. An identical steer control mechanism of a radial bar-link trapezoidal swing arm mounted in the middle of a front end of a vehicle body without steering function in a rear wheel of a vehicle, comprising:

a radius bar, a first end of the radius bar is fixed to the bottom of a steering wheel column, wherein a steering angle of a steering wheel is $\alpha$, a length of the radius bar is R; the steering wheel rotates to drive the radius bar to generate a sine sin $\alpha$ and a cosine cos $\alpha$; the sine sin $\alpha$ and the cosine cos $\alpha$ are configured to follow rotation of the steering wheel;

a first trapezoidal swing are, one end of the first trapezoidal swing arm is perpendicularly fixed to a second end of the radius bar, wherein a fixed pendulum shaft is formed at a fixed point of the first trapezoidal swing arm and the radius bar; a length of the first trapezoidal swing arm is R*M/Hi, M represents a distance between steering axles of two front wheels of a vehicle body: Hi represents a distance from any steering axle to a steering center point of a frame; and the first trapezoidal swing arm is configured to deflect along with the steering angle of the steering wheel $\alpha$, and simultaneously generates a longitudinal cosine compensation effect of (R*M/Hi)*sin $\alpha$ and a longitudinal displacement of R*cos $\alpha \pm$(R*M/Hi)*sin $\alpha$;

a sinusoidal connecting rod, the sinusoidal connecting rod is a horizontal rod arranged in a horizontal direction and has two sleeves, wherein the fixed pendulum shaft is configured to insert into a first sleeve, so the sinusoidal connecting rod is vertically positioned between the radius rod and the first trapezoidal swing arm so as to move along with the fixed pendulum shaft;

a driven radius bar, wherein a first end of the driven radius bar is configured to hinge in a second sleeve, a second end of the driven radius bar is configured to hinge to the frame; the driven radius bar is parallel to the radius bar and has a same length; the driven radius bar, the sinusoidal connecting rod, the frame, and the radius bar form a parallel four-bar linkage mechanism;

a first two-dimensional composite control transmission arm, wherein a cross-shaped groove is arranged on the first two-dimensional composite control transmission arm; a transverse groove of the cross-shaped groove is parallel to half-shafts on both sides, while a vertical groove of the cross-shaped groove is parallel to the longitudinal direction of the vehicle body; and a connecting arm is extended on one side of the transverse groove;

a first vector control swing arm, a sliding slot is arranged on the first vector control swing arm; an initial position of a setting direction of the sliding slot is parallel to an arrangement direction of the radius bar;

a first set of sliders, a first slider of the first set of sliders is configured to fix on one end of the sinusoidal connecting rod and is slidable in the vertical groove to form a horizontal sinusoidal displacement R*sin $\alpha$ of the first two-dimensional composite control transmission arm; a second slider of the first set of sliders is configured to hinge to the second end of the first trapezoidal swing arm and is slidable in the transverse groove, so a longitudinal displacement of the first two-dimensional composite control transmission arm is equal to R*cos $\alpha \pm$(R*M/Hi)*sin $\alpha$; thus controlling the first two-dimensional composite control transmission arm to move up and down, left and right vertically and horizontally; a third slider of the first set of sliders is configured to hinge with one end of the connecting arm to form a critical control point GI and is slidable in the sliding slot; and an auxiliary steering shaft or a solid steering shaft is connected to the sliding slot, when the auxiliary steering shaft is connected to the sliding slot, the third slider of the first set of sliders is configured to drive the sliding slot to rotate around the auxiliary steering shaft, making the auxiliary steering shaft generate a steering angle $\beta i$, then the auxiliary steering shaft is connect with a parallel connecting rod by the solid steering shaft;

when the solid steering shaft is connected to the sliding slot, the solid steering shaft is directly connected and controlled by the first vector control swing arm, and the first third slider drives the sliding slot to rotate around the solid steering shaft to generate the steering angle $\beta i$, then the solid steering shaft is configured to connect to a hub half shaft axially and vertically to make R*cos $\beta i$=R*cos $\alpha$+R*M/H*sin $\alpha$.

2. The control mechanism of claim 1, wherein the length of the radius bar R is determined by an installation space on the vehicle body.

3. The control mechanism of claim 1, wherein both of the first slider of the first set of sliders and the second slider of the first set of sliders have a length greater than twice of a cross-slot width of the cross-shaped groove.

4. The control mechanism of claim 1, further comprising a housing; the radius bar, the driven radius bar, the first trapezoidal swing arm, the sinusoidal connecting rod, the first two-dimensional composite control transmission arm, the first vector control swing arm, and the sliders are fixed in the housing; the bottom of the steering wheel column is configured to insert into the top of the housing and fixed to the radius bar; and the auxiliary steering shaft is configured to extend out of the housing to connect the synchronous gear shaft or the parallel connecting rod or a crankshaft double-connecting rod with the solid steering shaft.

5. The control mechanism of claim 1, wherein two trapezoidal swing arms, two two-dimensional composite control transmission arms, two vector control swing arms, and two sets of sliders are provided, wherein the first trapezoidal swing arm is an active trapezoidal swing arm; the first two-dimensional composite control transmission arm is an active two-dimensional composite control transmission arm; the first vector control swing arm is an active vector control swing arm, and the first set of sliders are active sliders; a second trapezoidal swing arm is a driven trapezoidal swing arm; a second two-dimensional composite control transmission arm is a driven two-dimensional composite control transmission arm; a second vector control swing arm is a driven vector control swing arm, and a second set of sliders are driven sliders: wherein the first trapezoidal swing arm is configured to fix to the first sleeve and is parallel to the radius bar: the second trapezoidal swing arm is configured to fix to the second sleeve and is parallel to the first trapezoidal swing arm; the other side of the transverse groove of the second two-dimensional composite control transmission arm is provided with the connecting arm configured to drive the second vector control swing arm through a third slider of the second set of sliders; installation positions of a first slider and a second slider of the second set of sliders are the same as installation positions of the first slider and the second slider of the first set of sliders.

6. The control mechanism of claim 5, wherein a crank-shaft double-connecting rod mechanism is configured to connect the radius bar and the driven radius bar, a fixed-length crank is respectively arranged on a same vertical phase of the radius bar and the driven radius bar, the fixed-length cranks are connected by a crank connecting rod to form the crank shaft double-connecting mechanism; wherein a radius of each fixed-length crank is a constant value of R/2 to 4R/5.

7. The control mechanism of claim 1, wherein two trapezoidal swing arms, two two-dimensional composite control transmission arms, two vector control swing arms, and two sets of sliders are provided; wherein the first two-dimensional composite control transmission arm is arranged at an upper level near the frame, while a second two-dimensional composite control transmission arm is at a lower level of the first two-dimensional composite control transmission arm to ensure the initial position $\alpha=\beta=0$; a double-connecting rod mechanism at an end of the first trapezoidal swing arm is configured to pass through the bottom of the second slider of the first set of sliders, connect to the second trapezoidal swing arm and then connect to drive a second slider of the second set of sliders; and a first slider of the second set of sliders is fixed on the other end of the sinusoidal connecting rod, and is configured to move along with the radius rod and the sinusoidal connecting rod; a length of the second trapezoidal swing arm is twice a length of the first trapezoidal swing arm; and the two trapezoidal swing arms are connected to second sliders of the two sets of sliders correspondingly; wherein the driven radius rod is configured to be replaceable with a floating vertical chute arranged on the frame, and the floating vertical chute is configured to connect to and control the sinusoidal connecting rod to keep parallel to an axle, wherein the floating vertical chute comprises a horizontal floating chute which is fixedly connected to the frame and is parallel to the axle and a vertical floating chute which is perpendicularly arranged to the horizontal floating chute; a transverse fourth slider in the horizontal floating chute is provided, and the horizontal floating chute is fixed to the vertical floating chute through the transverse fourth slider; a longitudinal fifth slider is slidably arranged in the vertical floating chute, the longitudinal fifth slider is fixed to the first slider; or the transverse fourth slider is vertically fixedly connected to the longitudinal fifth slider which is slidably connected with the vertical floating chute, and the transverse fourth slider is slidably connected with the horizontal floating chute, and the vertical floating chute is fixedly connected with the sinusoidal connecting rod; an upper end of the transverse fourth slider extends below the vertical groove of the two-dimensional composite control transmission arm of the first set, and a lower end of the transverse fourth slider extends above the vertical groove of the two-dimensional composite control transmission arm of the second set, and is parallel to the opposite side of a square frame in combination with the sinusoidal connecting rod; the floating vertical chute is configured to control the sinusoidal connecting rod to move along the floating vertical chute horizontally and vertically.

8. A multi-wheel vehicle comprising the vehicle body and the control mechanism of claim 1 and a safety limiter; wherein the safety limiter comprises a spring pressure correction cam mechanism and a high-speed safety rotation angle limiting mechanism which are sequentially fixed on the steering wheel column from top to bottom; a pressure sensitive resistance gauge is configured to insert into a cut-off part of a shaft core of the steer wheel column and a gap between the radius bar and both sides of a ring disk notch, the axle center of the solid steering shaft is vertically connected with a vehicle hub half axle, and the safety limiter is used for limiting the steering angle $\alpha$ of the steering wheel to be less than 3 degrees when the vehicle speed is greater than 80 km/h.

9. A controlling method for an identical steer control mechanism of a radial bar-link trapezoidal swing arm, comprising:
forming a right triangle by arranging a radius bar and a first trapezoidal swing arm perpendicular to the radius bar, wherein the radius bar is a short right-angled side of the right triangle, the first trapezoidal swing arm is a long right-angled side of the right triangle; an extension line of a oblique right-angled side of the right triangle points to a steering center of a frame, the steering center of the frame is a point on a fixed axle which does not participate in steering;
rotating a steering wheel angle $\alpha$ to equal 90 degrees to make a traveling steering center coincide with a steering center point of the frame, wherein the short right-angled side of the right triangle deflects with the long right-angled side of the right triangle, and a longitudinal displacement of a top point of the short right-angled side of the right triangle is equal to $R*\cos \beta = R*\cos \alpha + (R*M/Hi)*\sin \alpha$, which is a universal steering formula evolved from Ackermann's steering formula;
hinging an end of the first trapezoidal swing arm, which is also a top point of the short right-angled side of the right triangle, with a transverse groove of a first two-dimensional composite control transmission arm to control a longitudinal cosine displacement; wherein the transverse groove is connected to a second slider of a first set of sliders;
hinging an end bearing of the radius bar which is also a crossing point of the long right-angled side of the right triangle and the short right-angled side of the right triangle with a sinusoidal connecting rod to control a sinusoidal displacement, wherein the sinusoidal connecting rod is fixed to a first slider of the first set of sliders,
connecting a vertical groove to transmit the sinusoidal displacement to the vertical groove, and controlling the first two-dimensional composite control transmission arm horizontally and vertically;
hinging a two-dimensional composite critical control point Gi with a third slider of the first set of sliders via a connecting arm by the first two-dimensional composite control transmission arm, thus producing a rotating angle by drivingly controlling a sliding slot; and
forming a deflection elliptical compass by a combination of the right triangle and a cross-shaped groove of the first two-dimensional composite control transmission arm;
wherein M represents a distance between between steering axles of two front wheels of a vehicle body; Hi represents a distance from any steering axle to the steering center point of the frame.

* * * * *